: US 12,542,503 B2
(45) Date of Patent: Feb. 3, 2026

(12) United States Patent
Kobayashi et al.

(54) CONTROL DEVICE

(71) Applicant: FANUC CORPORATION, Yamanashi (JP)

(72) Inventors: Daisuke Kobayashi, Yamanashi (JP); Keisuke Tsujikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 161 days.

(21) Appl. No.: 18/689,867

(22) PCT Filed: Sep. 30, 2021

(86) PCT No.: PCT/JP2021/036140
§ 371 (c)(1),
(2) Date: Mar. 7, 2024

(87) PCT Pub. No.: WO2023/053343
PCT Pub. Date: Apr. 6, 2023

(65) Prior Publication Data
US 2024/0388233 A1  Nov. 21, 2024

(51) Int. Cl.
G05B 19/406 (2006.01)
H02P 23/14 (2006.01)

(52) U.S. Cl.
CPC ................... H02P 23/14 (2013.01)

(58) Field of Classification Search
CPC ........ G05B 19/406; G05B 2219/50198; G05B 2219/50195; H02P 23/14; Y02P 90/02
USPC ........................................................ 318/461
See application file for complete search history.

(56) References Cited

U.S. PATENT DOCUMENTS

| 2004/0002778 A1* | 1/2004 | Giamona ........... G05B 19/4141 |
| | | 700/61 |
| 2007/0282557 A1* | 12/2007 | Uchida ................ G05B 19/406 |
| | | 702/182 |
| 2009/0007622 A1 | 1/2009 | Colorons et al. |
| 2010/0234974 A1 | 9/2010 | Bosga |
| 2016/0363924 A1* | 12/2016 | Tanaka ............... G05B 19/4063 |
| 2017/0261967 A1 | 9/2017 | Shimura et al. |

(Continued)

FOREIGN PATENT DOCUMENTS

| JP | 2009-525877 A | 7/2009 |
| JP | 2009-539613 A | 11/2009 |

(Continued)

Primary Examiner — Gabriel Agared
(74) Attorney, Agent, or Firm — HAUPTMAN HAM, LLP

(57) ABSTRACT

This control device controls a buffer motor supplied with power from a power source that is shared with a drive motor driving an industrial machine, the control device comprising: a motor speed specifying unit that specifies the current speed of the buffer motor; an emergency stop detection unit that detects an emergency stop state; a buffer motor command generation unit that establishes, as an initial speed, the speed of the buffer motor at a prescribed timing after the detection of the release of the emergency stop by the emergency stop detection unit specified by the motor speed specifying unit, and generates a command for returning the speed of the buffer motor to a predetermined base speed at a predetermined prescribed acceleration; and a buffer motor control unit that controls the buffer motor on the basis of the command generated by the buffer motor command generation unit.

9 Claims, 7 Drawing Sheets

(56) References Cited

U.S. PATENT DOCUMENTS

| | | | | |
|---|---|---|---|---|
| 2019/0115759 A1* | 4/2019 | Shinoda | ................. | H02P 25/22 |
| 2019/0115858 A1* | 4/2019 | Shinoda | ................. | H02P 27/08 |
| 2019/0149073 A1* | 5/2019 | Shinoda | ............... | H02M 7/003 |
| | | | | 363/13 |
| 2019/0267835 A1* | 8/2019 | Shinoda | ................... | H02J 1/16 |
| 2019/0339666 A1* | 11/2019 | Hashimoto | ............ | H02P 29/00 |
| 2020/0052489 A1* | 2/2020 | Shinoda | ................... | H02J 1/16 |
| 2021/0018898 A1* | 1/2021 | Nakamura | ............... | H02P 3/18 |
| 2021/0041848 A1* | 2/2021 | Tajima | .................... | B23Q 5/10 |

FOREIGN PATENT DOCUMENTS

| | | |
|---|---|---|
| JP | 2017-005913 A | 1/2017 |
| JP | 2017-162300 A | 9/2017 |
| JP | 2019-075864 A | 5/2019 |
| JP | 2019-092239 A | 6/2019 |
| JP | 2021-019418 A | 2/2021 |

* cited by examiner

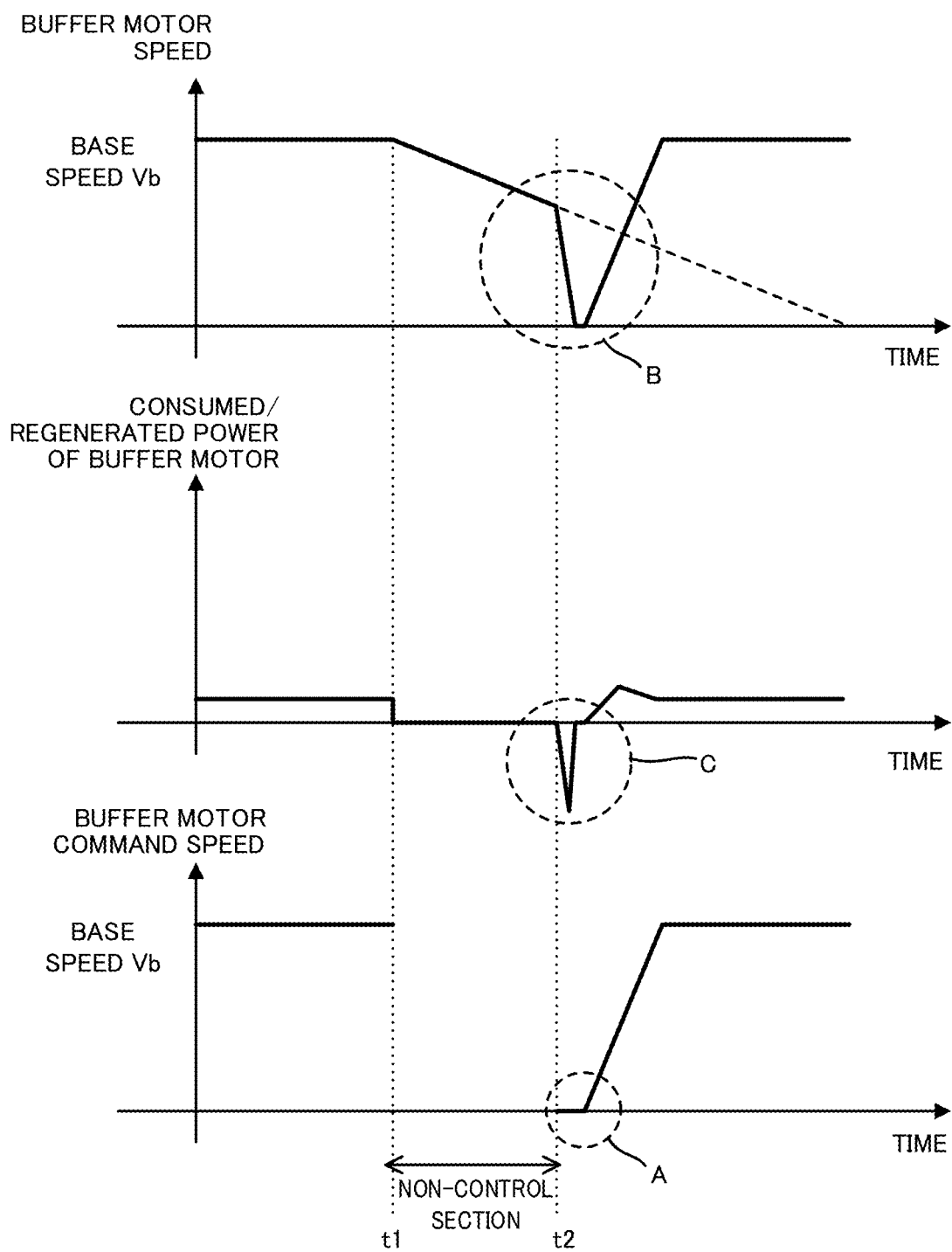

CONTROL DEVICE

RELATED APPLICATIONS

The present application is a National Phase of International Application No. PCT/JP2021/036140 filed Sep. 30, 2021.

TECHNICAL FIELD

The present invention relates to a controller.

BACKGROUND ART

There are a number of industrial machines, such as a machine tool, an injection molding machine and a robot, installed in a manufacturing site, such as a factory, that are operated based on commands from a controller that controls the industrial machines. These industrial machines are connected to a predescribed power-supply facility. Thus, the industrial machines are operated by consuming power supplied from this power-supply facility (see e.g., Patent Literature 1). Hence, if a command that consumes a large amount of power is executed, e.g., a command is executed to rapidly accelerate a drive motor for driving a moving element of the industrial machine, the large amount of power is consumed in the industrial machine.

In such a case, as a mechanism for reducing power consumption, regenerative power in a motor is utilized. For example, as shown in FIG. 6, another motor, different from the drive motor for the industrial machine, is driven in advance at a predetermined speed (hereinafter referred to as "base speed"). This other motor is decelerated at the timing of power consumption in the industrial machine. Consequently, regenerative power is generated from this other motor, and the regenerative power is used to reduce the power consumption. The other motor provided for the above purpose is referred to as a buffer motor in this specification. The buffer motor accelerates or decelerates on the basis of the base speed to decrease peak power in response to the operation of the drive motor.

When an emergency stop button is pushed to stop the industrial machine during an emergency, a channel of power supply from a commercial power source is shut down. In the case where a common power source is shared between the drive motor and the buffer motor as illustrated in FIG. 6, when the drive motor for driving the industrial machine is brought to emergency stop, the buffer motor is also brought to emergency stop.

There is dynamic brake module that is a mechanism for decelerating the rotation of the motor during the emergency stop (hereinafter referred to as "DBM"). The DBM is configured to develop a short circuit between terminals of a servomotor via a resistor, so as to consume rotational energy as heat. By incorporating the DBM, the motor can be stopped quickly without coasting in an emergency stop. However, there is a problem that frequent emergency stop causes the DBM to become hot and unusable. Thus, the buffer motor may be used without incorporating the DBM because the buffer motor does not incur a large risk even if its rotation is not stopped promptly in emergency.

PRIOR ART DOCUMENT

Patent Literature

[Patent Literature 1] Japanese Patent Laid-Open Publication No. 2017-162300

SUMMARY OF THE INVENTION

Problems to be Solved by the Invention

If the emergency stop is applied to the buffer motor with no DBM being incorporated, speed control is lost and the buffer motor will coast for long period of time. For example, when a motor is induced to coast during 3,000 revolutions per minute, it takes about six minutes for the motor to stop rotating. Thus, in a case where the operation of the buffer motor having no DBM incorporated therein is defined to be resumed after its rotation is stopped when the motor is brought to the emergency stop, a problem arises that a wait time is developed each time the emergency stop occurs, resulting in a significant reduction in operating efficiency in the industrial machine.

In order to solve the problem, as soon as the cause of the emergency stop is resolved, the emergency stop can be removed and the operation of the industrial machine is resumed even when the buffer motor is coasting. FIG. 7 is a graph illustrating the changes in the speed of the buffer motor, the power consumption and a command speed when the emergency stop is removed while the buffer motor is coasting. The example in FIG. 7 shows that the emergency stop is applied at a time t1, and then the cause of the emergency stop is resolved and the emergency stop is removed at a time t2. During the operation of the industrial machine, the buffer motor is driven to maintain a predetermined base speed Vb. No command is given to the buffer motor from the time t1 at which the emergency stop is applied to the time t2 at which the emergency stop is removed, and no control is conducted during the above interval. The buffer motor coasts in this non-control interval, and its speed decreases as time passes. Then, when the emergency stop is removed at the time t2, a controller starts controlling the buffer motor. In this case, the controller assumes that the initial speed of the motor is zero (reference sign A), and then conducts the speed control to increase the speed to the base speed Vb. As a consequence, when the emergency stop is removed while the buffer motor is coasting, the buffer motor decelerates rapidly from the coasting speed (reference sign B). At this time, a large amount of regenerative power is generated in the buffer motor (reference sign C). It is desired to avoid the generation of such a large amount of regenerative power.

Thus, there is a need for a mechanism that can quickly resume the operation of the industrial machine without generating the large amount of regenerative power in the buffer motor.

Means for Solving the Problem

A controller according to the present disclosure solves the above-described problem by determining a speed of a buffer motor at a predefined timing after removal of an emergency stop, and using the determined speed as an initial speed to output a command for controlling the speed of the buffer motor. The predefined timing may be a time at which the emergency stop is removed. The predefined timing may also be a time at which the speed of the buffer motor reaches a prescribed threshold value which is defined in advance. In this case, the prescribed threshold value is a speed that does not cause large power consumption even when the motor accelerates from the threshold value to a base speed.

One aspect of the present disclosure is a controller for controlling a buffer motor that is supplied with power from a power source shared with a drive motor for driving an industrial machine, including: a motor speed determination unit that determines a present speed of the buffer motor; an emergency stop detection unit that detects a state of emergency stop; a buffer motor command creation unit that defines a speed of the buffer motor determined by the motor speed determination unit as an initial speed at a predetermined timing after the removal of the emergency stop is detected by the emergency stop detection unit, and creates a command to return the speed of the buffer motor to a prescribed base speed defined beforehand at a prescribed acceleration defined beforehand; and a buffer motor control unit that controls the buffer motor based on the command created by the buffer motor command creation unit.

Effect of the Invention

The aspect of the invention enables the resumption of the operation of the industrial machine in a short time without consuming a large amount of power in the buffer motor.

BRIEF DESCRIPTION OF THE DRAWINGS

FIG. 7 illustrates changes in a speed of the buffer motor, the power consumption and a command speed when the emergency stop is removed while the buffer motor is coasting.

MODE FOR CARRYING THE INVENTION

A description will now be made about an embodiment of the present invention with reference to the accompanying drawings.

Figure 1:
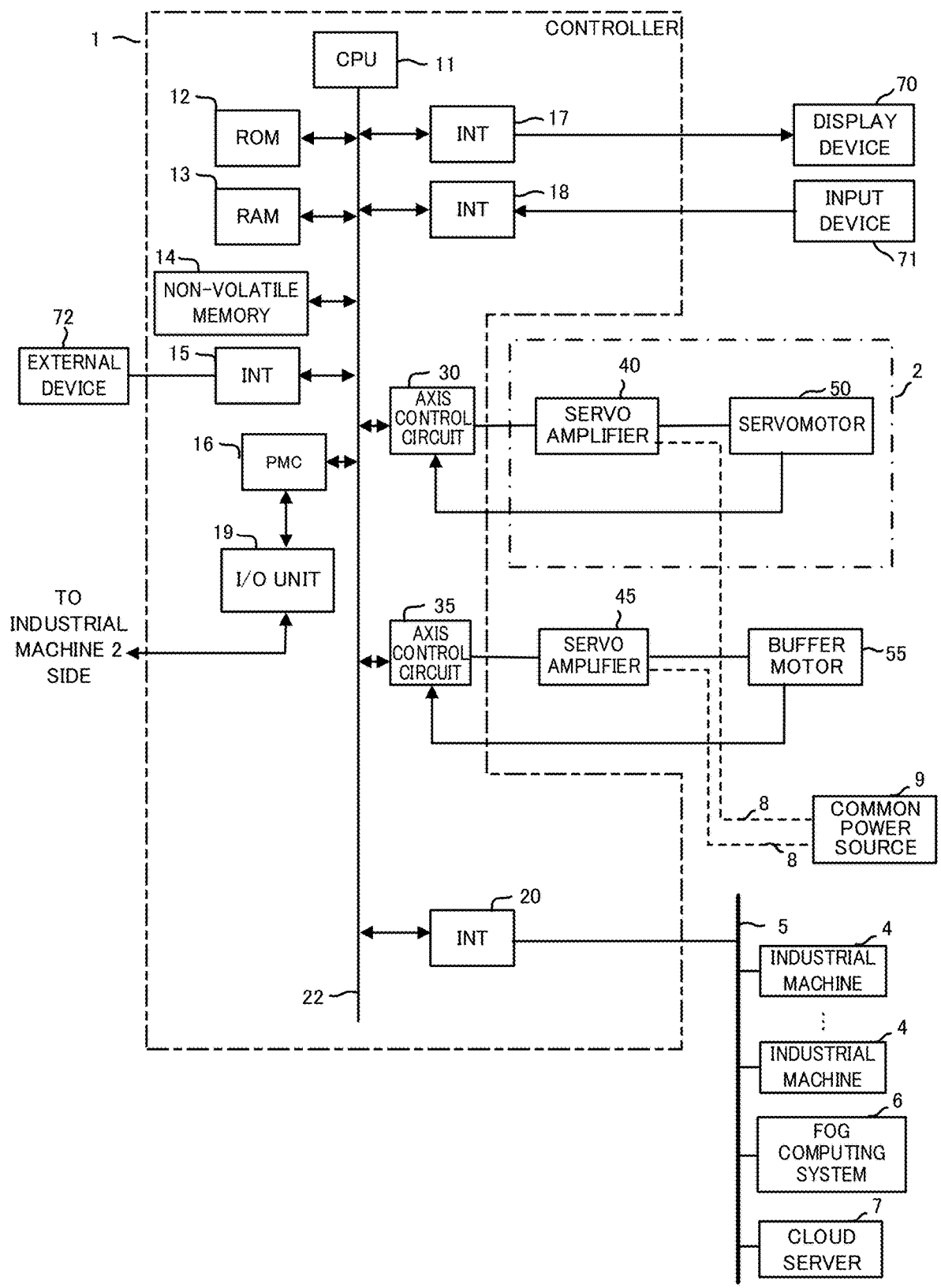
FIG. 1 is a schematic hardware configuration diagram of a controller according to an embodiment of the present invention.

FIG. 1 is a schematic hardware configuration diagram showing a main part of a controller according to a first embodiment of the present invention. A controller 1 of the invention can be implemented as a controller for controlling industrial machines, such as a machine tool and a robot, based on a control program, for instance.

The controller 1 includes a central processing unit (CPU) 11 that is a processor for controlling the entire controller 1. The CPU 11 is configured to read a system program stored in a read-only memory (ROM) 12 through a bus 22 to thereby control the entire controller 1 in accordance with the system program. A random-access memory (RAM) 13 is configured to temporarily store temporary computation data and pieces of data to be displayed, as well as various data externally input.

A non-volatile memory 14 is, for instance, a memory or solid state drive (SSD) that is backed up by a battery, not shown, so that a state of storage is retained even when a power source of the controller 1 is turned off. The non-volatile memory 14 is configured to store, for example, pieces of data acquired from an industrial machine 2, control programs and pieces of data read from an external device 72 via an interface 15, control programs and pieces of data input through an input device 71, and control programs and pieces of data acquired from the other devices via a network 5. The control programs and the pieces of data stored in the non-volatile memory 14 may be deployed into the RAM 13 when they are executed/used. Furthermore, the ROM 12 is configured to store beforehand various system programs, such as known analysis programs.

The interface 15 is configured to connect the CPU 11 of the controller 1 to the external device 72, such as a USB device. From the external device 72, for example, control programs and setting data are read for controlling the industrial machine 2. In addition to that, control programs, setting data and the like which are edited in the controller 1 can be stored in external storage means through the external device 72. A programmable machine controller (PMC) 16 is provided to execute a ladder program to output a signal for the control via an I/O unit 19 to the industrial machine 2 and its peripheral devices (e.g., a tool exchanger, an actuator for a robot and others, a plurality of sensors 3, such as temperature sensor and humidity sensor attached to the industrial machine 2). In addition to that, the PMC 16 receives signals from switches of an operation board arranged on the main body of the industrial machine 2, the peripheral devices and others, and passes the signals to the CPU 11 after conducting necessary signal processing.

An interface 20 is provided to connect the CPU of the controller 1 to the network 5 that is either wired or wireless. To the network 5, other industrial machines 4, such as a machine tool and an electric discharge machine, a fog computing system 6, a cloud server 7 and the like are connected so as to exchange data with the controller 1.

A display device 70 is provided to display, such as, pieces of data that are acquired by executing data and programs loaded on a memory and output through an interface 17. In addition to that, the input device 71 consists of a keyboard, pointing device and others and is configured to transfer commands, pieces of data and the like obtained by the operation made by an operator to the CPU 11 via an interface 18.

An axis control circuit 30 for controlling axes included in the industrial machine 2 is provided, and is configured to receive an axis move command value from the CPU 11 and output commands for the axes to a servo amplifier 40. In response to the received commands, the servo amplifier 40 drives a servomotor 50 that is configured to move the axes included in the machine tool. The servomotor 50 for the axes is equipped with a position/speed detector, and feeds back a position/speed feedback signal acquired from the position/speed detector to the axis control circuit 30 to thereby control position/speed feedback. Although the hardware configuration diagram in FIG. 1 shows one each of the axis control circuit 30, the servo amplifier 40 and the servomotor 50, these elements are actually provided for the number of axes included in the industrial machine 2 to be controlled.

Furthermore, an axis control circuit 35 for controlling a buffer motor 55 is provided that receives a rotation command value for the buffer motor 55 from the CPU 11 to thereby output a command for driving the buffer motor 55 to a servo amplifier 45. The servo amplifier 45 drives the buffer motor 55 in response to this command. The buffer motor 55 is also equipped with a position/speed detector, and feeds back a position/speed feedback signal acquired from the position/speed detector to the axis control circuit 35 to thereby control position/speed feedback. The servo amplifier 40 and the servo amplifier 45 receive power supply from a common power source 9 via a power supply channel 8.

Figure 2:
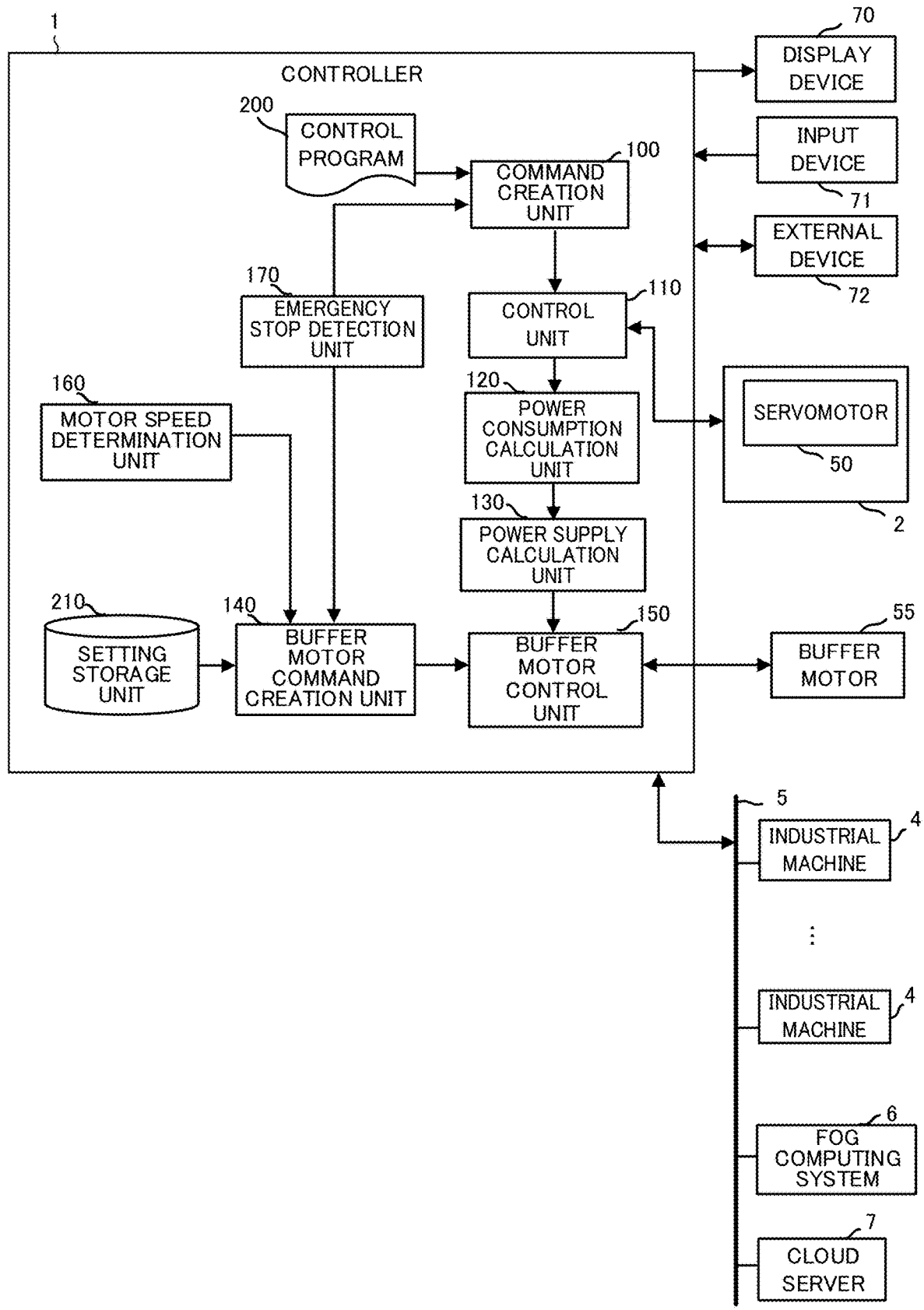
FIG. 2 is a block diagram schematically showing functions of the controller according to a first embodiment of the present invention.

FIG. 2 shows the functions of the controller 1 according to the first embodiment of the invention with a schematic block diagram. The functions of the controller 1 according to the illustrative embodiment are implemented in such a way that the CPU 11 included in the controller 1 shown in FIG. 1 executes the system program to thereby control the operation of each component of the controller 1.

The controller 1 of the illustrative embodiment includes a command creation unit 100, a control unit 110, a power consumption calculation unit 120, a power supply calculation unit 130, a buffer motor command generation unit 140, a buffer motor control unit 150, a motor speed determination unit 160 and an emergency stop detection unit 170. In addition to that, the RAM 13 or the non-volatile memory 14 of the controller 1 stores in advance a control program 200 for controlling the operation of the industrial machine 2, and a setting storage unit 210 is also provided in advance to the controller 1, the storage unit being a region for storing settings for controlling the buffer motor 55.

The command creation unit 100 is configured to analyze blocks of the control program 200, and generate a command for controlling each component of the industrial machine 2 based on the result of analysis. For example, in a case where a block of the control program 200 instructs to move each axis of the industrial machine 2, the command creation unit 100 creates a move command for moving the servomotor 50 according to the instruction by the block. Furthermore, in a case where a block of the control program 200 instructs to control a peripheral device of the industrial machine 2, for instance, the command creation unit 100 creates a command for operating the peripheral device. The command created by the command creation unit 100 is output to the control unit 110. The command creation unit 100 suspends the creation of commands for the control on the industrial machine 2 when receiving notification of detection of an emergency stop from the emergency stop detection unit 170. When receiving notification of detection of emergency stop removal from the emergency stop detection unit 170, the command creation unit 100 then resumes the creation of commands for the control on the industrial machine 2.

The control unit 110 is implemented in such a way that the CPU 11 of the controller 1 shown in FIG. 1 executes a system program read from the ROM 12, and primarily, the CPU 11 conducts arithmetic processing by using the RAM 13 and the non-volatile memory 14, control processing on the components of the industrial machine 2 by using the axis control circuit 30 and the PMC 16, and input and output processing via the interface 18. The control unit 110 is configured to control the components of the industrial machine 2 based on commands input from the command creation unit 100. For example, in a case where a command input from the command creation unit 100 instructs to move the servomotor 50 of the industrial machine 2, the control unit 110 creates move command data according to the instruction and outputs the data to the servomotor 50. In a case where the command input from the command creation unit 100 instructs to operate a peripheral device attached to the industrial machine 2, for instance, the control unit 110 generates a predetermined signal for operating the peripheral device and outputs the signal to the PMC 16. Furthermore, the control unit 110 is configured to acquire positional feedback, speed feedback and torque feedback of the servomotor 50 and data detected by the peripheral devices, such as a temperature sensor and a humidity sensor, so as to use them for controlling the industrial machine 2.

The power consumption calculation unit 120 is configured to calculate power to be consumed for driving the servomotor 50 which drives the industrial machine 2 based on an operation state and details of the control of the servomotor 50 driving the industrial machine 2 by the control unit 110. The power to be consumed for driving the servomotor 50 can be calculated based on, for example, an output $V_d \times T_d$ of the servomotor 50 calculated based on a rotation speed $V_d$ and a torque $T_d$ of the servomotor 50 and losses $L_d$ occurring in, such as, the servomotor 50 and the servo amplifier 40. The losses $L_d$ occurring in the servomotor 50 and the servo amplifier 40 are usually small enough comparing the output (its absolute value) of the servomotor 50, so that the losses may be calculated as power consumption based on the output of the servomotor 50. The power consumption calculation unit 120 may calculate present power to be consumed for driving the servomotor 50 by using the speed feedback and the torque feedback which are fed back from the servomotor 50, by way of example. In regard to a method for calculating power consumption, there are known arts disclosed by, such as, Japanese Patent Laid-Open Publication No. 2019-075864 and Japanese Patent Laid-Open Publication No. 2019-092239, and thus a detailed description will be omitted in this specification.

The power supply calculation unit 130 is configured to calculate an amount of regenerative power to be supplied from the buffer motor 55 based on an amount of power to be consumed for driving the servomotor 50 calculated by the power consumption calculation unit 120. For example, the power supply calculation unit 130 calculates a value obtained by subtracting the amount of power consumption calculated by the power consumption calculation unit 120 from a maximum available power from the common power source 9 which is set beforehand. In a case where the calculated value is lower than a predetermined threshold value $Th_d$ which is set beforehand, the lower value is calculated as an amount of regenerative power to be supplied from the buffer motor 55. In a case of setting the threshold value $Th_d$ to zero, a value that is obtained by subtracting the consumption power of the servomotor 50 from the maximum available power of the common power source 9 and is lower than the threshold value $Th_d$ (=0) represents the power insufficient for driving the servomotor 50. Thus, the lower value can be set as the amount of regenerative power to be supplied from the buffer motor 55. The threshold value $Th_d$ may be set as a positive value having a predetermined margin for safety.

When the notification of detection of removal of the emergency stop is received from the emergency stop detection unit 170, the buffer motor command creation unit 140 defines a speed input from the motor speed determination unit 160 at prescribed timing set in advance as an initial speed of the buffer motor 55 to thereby create a command to control the speed of the buffer motor 55 such that the motor accelerates from the initial speed to a base speed Vb at an acceleration Ab. The prescribed timing may be, for instance, timing at which the notification of detection of removal of the emergency stop. In this case, the initial speed of the buffer motor 55 is a speed of the buffer motor 55 at the time the emergency stop is removed. In addition to that, the prescribed timing may be, for example, timing at which the speed of the buffer motor 55 is decreased to a predetermined threshold value $V_{th}$ which is set beforehand by, for example, keeping the buffer motor 55 in a free-running state after receiving the notification of detection of removal of the emergency stop. The predetermined threshold value $V_{th}$ is a speed that does not cause large power consumption even when the motor accelerates from this speed to the base speed Vb at the acceleration Ab. The prescribed threshold value $V_{th}$ may be determined in advance by conducting an experiment for each type of the buffer motor, by way of example. The command created by the buffer motor command creation unit 140 is output to the buffer motor control unit 150.

The buffer motor control unit 150 is for controlling the buffer motor 55. In a case where the industrial machine 2 is in a normal operation and the amount of regenerative power input from the power supply calculation unit 130 to be supplied from the buffer motor 55 is zero, the buffer motor control unit 150 controls the buffer motor 55 such that the speed of the buffer motor 55 becomes the base speed Vb based on the base speed Vb of the buffer motor 55 stored beforehand in the setting storage 210 and the acceleration Ab when accelerating the buffer motor to the base speed Vb. Furthermore, in a case where the industrial machine 2 is in the normal operation and the amount of regenerative power input from the power supply calculation unit 130 to be supplied from the buffer motor 55 is the positive value, the buffer motor control unit 150 controls the buffer motor 55 to decelerate so that regenerative power corresponding to the amount of regenerative power to be supplied from the buffer motor 55 is generated. On the other hand, in a case where the amount of regenerative power input from the power supply calculation unit 130 to be supplied from the buffer motor 55 is a negative value, the buffer motor control unit 150 control the buffer motor 55 to accelerate so as to induce power consumption corresponding to the amount of regenerative power to be supplied from the buffer motor 55.

Furthermore, in a case where a command is input from the buffer motor command creation unit 140, the buffer motor control unit 150 controls the buffer motor 55 based on the command created by the buffer motor command creation unit 140. When the buffer motor 55 accelerates at the time of removing the emergency stop, the buffer motor control unit 150 may control the torque of the buffer moto 55 to be lower than a prescribed threshold value $T_{th}$ which is set beforehand. The prescribed threshold value $T_{th}$ is a torque value that does not cause the large power consumption when the buffer motor accelerates to the base speed Vb at the acceleration Ab. The prescribed threshold value $T_{th}$ may be determined in advance by conducting an experiment for each type of the buffer motor, by way of example.

The motor speed determination unit 160 is configured to determine the speed of the buffer motor 55 and output the determined speed of the buffer motor 55 to the buffer motor command creation unit 140. If the motor speed determination unit 160 is configured in its simplest form, it may determine the speed of the buffer motor 55 based on an input from a sensor, not shown, that detects the speed of the buffer motor 55.

Figure 3:
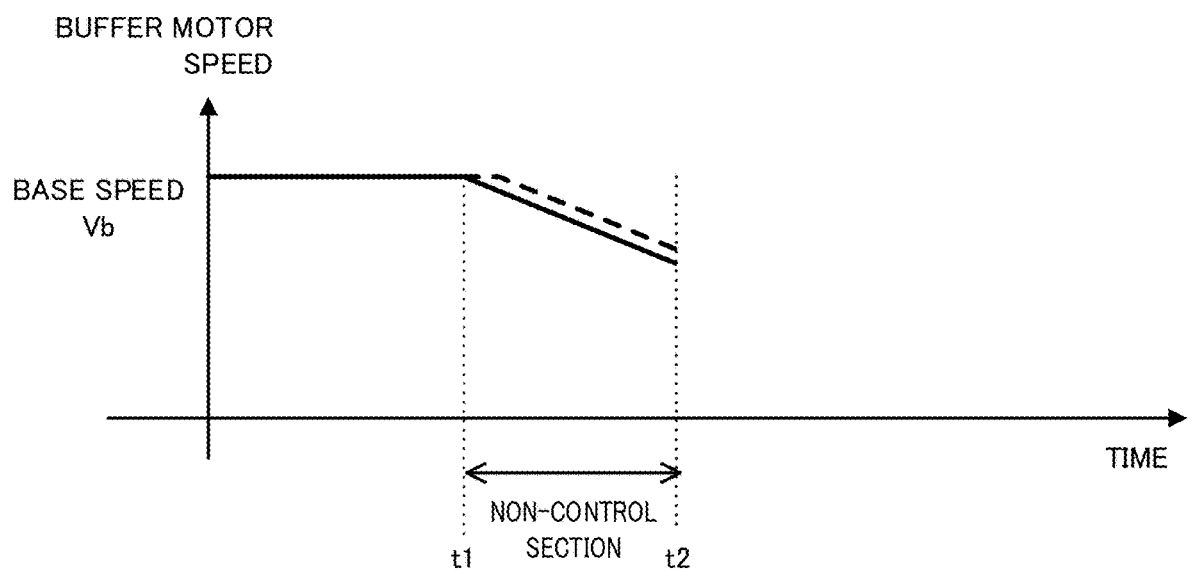
FIG. 3 illustrates a delay in detecting a speed.

As another example of determining the speed of the buffer motor 55, a speed of the buffer motor 55 previously detected by the sensor may be used to estimate the speed. In a similar fashion, history of the speed of the buffer motor 55 detected by the sensor is stored to estimate the present speed of the buffer motor 55 based on the stored speed history. There is some delay between the detection of the speed of the motor by the sensor and the acquisition of the detected speed by the motor speed determination unit 160. FIG. 3 shows an example in which the speed of the buffer motor 55 and the speed of the buffer motor 55 detected by the motor speed determination unit 160 using the sensor are shown on the same graph. In FIG. 3, a solid line indicates the speed of the buffer motor 55 at each time. In addition, a dotted line indicates the speed of the buffer motor 55 acquired by the motor speed determination unit 160 at each time. As shown in FIG. 3, in a section where the buffer motor 55 is coasting during the emergency stop, the speed of the buffer motor 55 acquired by the motor speed determination unit 160 has a value larger than that of an actual speed of the buffer motor 55 at the same time. Thus, when the speed of the buffer motor 55 acquired by the motor speed determination unit 160 is directly set as a present speed of the buffer motor 55 during emergency stop removal, rapid acceleration occurs right after starting control, causing the increase in the power consumption. In order to avoid such situation, the motor speed determination unit 160 determines a trend in changes based on acquired previous speed changes in the buffer motor 55 during the emergency stop of the buffer motor 55 and the history of the speed to estimate what value the speed of the buffer motor 55 will be after a delay time measured in an experiment or the like conducted beforehand. Then, the motor speed determination unit 160 outputs the estimated speed as a present speed of the buffer motor 55.

As another example of determining the speed of the buffer motor 55, the present speed of the buffer motor 55 may be estimated based on a speed of the buffer motor 55 at a time of applying the emergency stop and a time taken from the emergency stop to present. The rate at which the speed of the motor decreases while the motor is coasting typically depends on parameters, such as inertia and friction. Thus, an experiment is made beforehand by using the buffer motor 55 to plot the changes in the speed with respect to the time after the emergency stop. Then a regression analysis is conducted on date thus plotted to derive a regression formula, and the derived regression formula is used to estimate the present speed of the buffer motor 55 based on the speed of the buffer motor 55 at the time of applying the emergency stop and the time taken from the emergency stop to present. In the estimation, a speed of the buffer motor 55 at the time of starting the emergency stop and a time taken from the start of the emergency stop to present are used as explanatory variables for the regression formula and the present time is used as an objective variable. In a similar fashion, based on the plotted data, machine learning may be performed using a neural network or the like as a model to thereby use the created model for estimating the present speed of the buffer motor 55. In this estimation, the speed of the buffer motor 55 at the time of starting the emergency stop and the time taken from the start of the emergency stop to present are used as input data for a machine learning device and the present time is used as the objective variable for output data (label data). For the explanatory variables for the regression formula and the input data of the machine learning device, the parameters, such as inertia and friction, of the buffer motor 55 may be used. Furthermore, data on temperature and humidity may be added. This is because the temperature and the humidity have influence on the parameters, such as friction.

The emergency stop detection unit 170 is configured to detect the emergency stop and the removal of the emergency stop of the industrial machine 2, and output the detection result to the command creation unit 100 and the buffer motor command creation unit 140. The emergency stop detection unit 170 may detect on/off of the energization of the servo amplifier 40 and servo amplifier 45, for example, thereby detecting the emergency stop and the removal of the emergency stop. The emergency stop detection unit 170 may also detect a change in an emergency stop signal externally input and the operations of an emergency stop button, an emergency stop removal button and the like performed by the operator, for instance, thereby detecting the emergency stop and the removal of the emergency stop.

Figure 4:
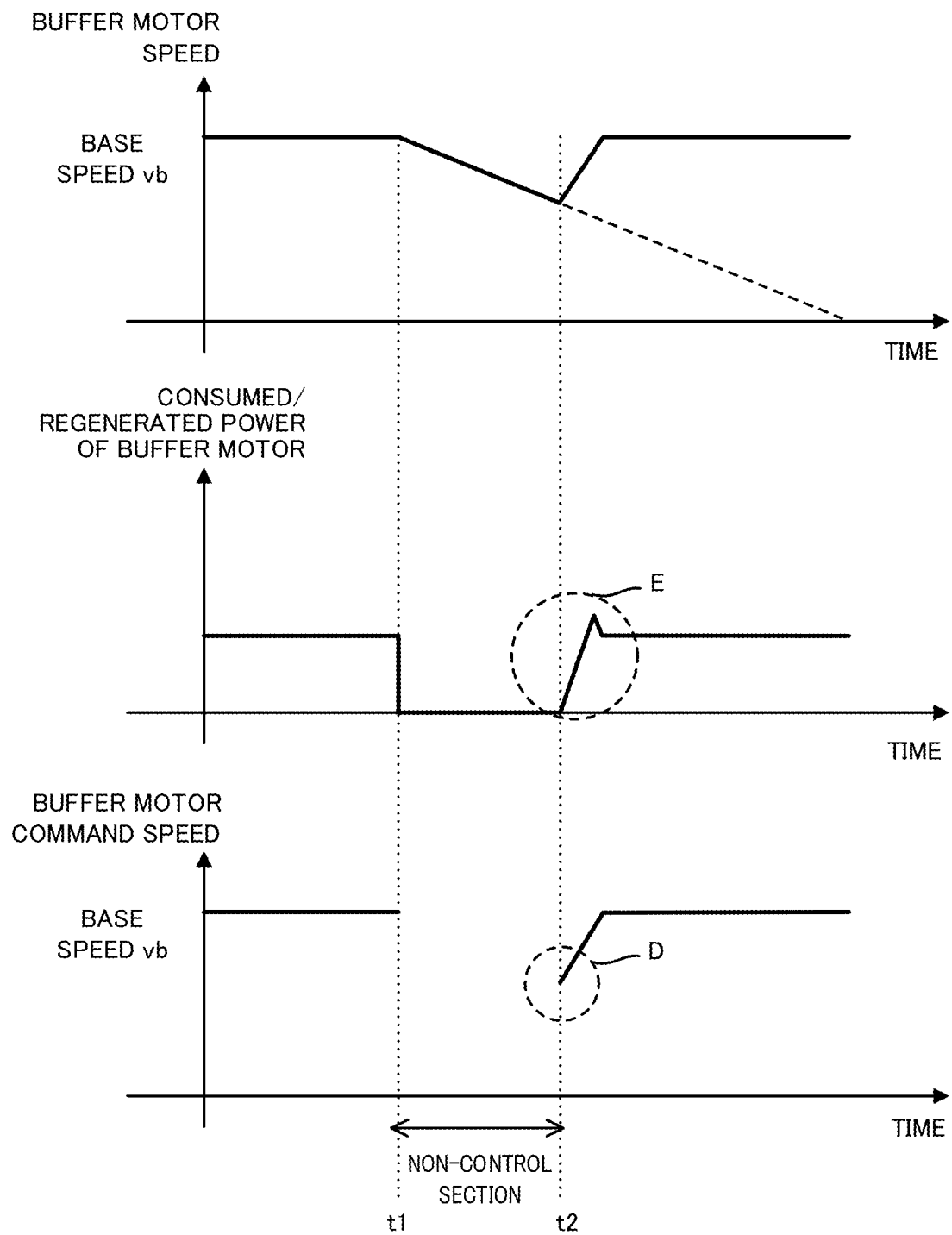
FIG. 4 illustrates how to lessen power consumption in a buffer motor when an emergency stop is removed by the controller according to the first embodiment.

Since the controller 1 with the above configuration enables the removal of the emergency stop without abruptly stopping the coasting buffer motor 55, the operation of the industrial machine can be resumed in a short time without consuming the large amount of power in the buffer motor. FIG. 4 is a graph illustrating the changes in the speed of the buffer motor 55, the power consumption and the command speed when the emergency stop is removed while the buffer motor 55 is coasting in the controller 1 according to the embodiment. The controller 1 according to the embodiment controls a speed at each time as an initial speed without abruptly stopping the buffer motor 55 when removing the emergency stop (reference sign D). Consequently, abrupt stop is not conducted, and the regenerative power is not generated during the abrupt stop (reference sign E), thereby returning the speed of the buffer motor 55 to the base speed.

Figure 5:
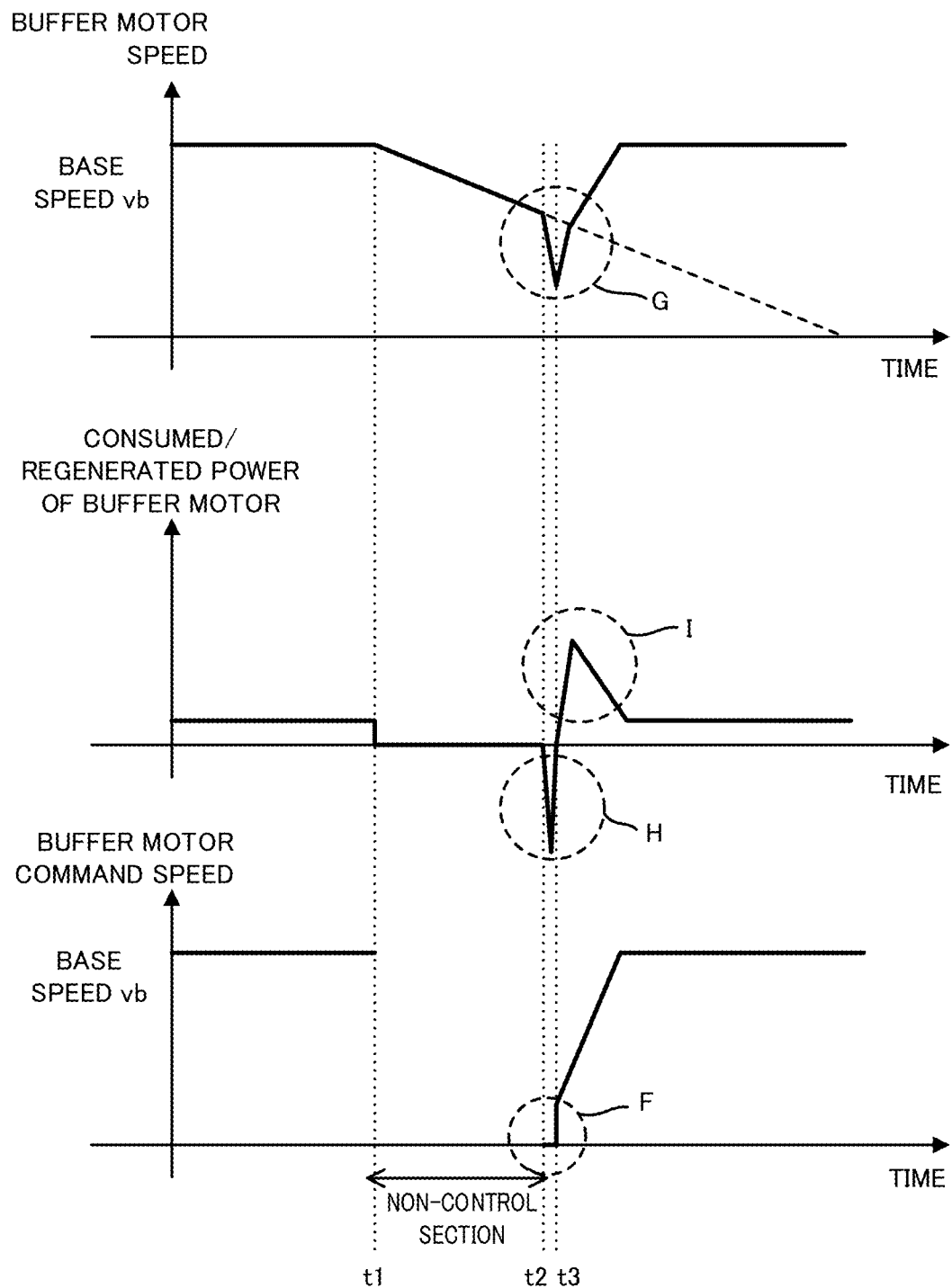
FIG. 5 illustrates a problem caused by a delay in detecting the emergency stop.
Figure 6:
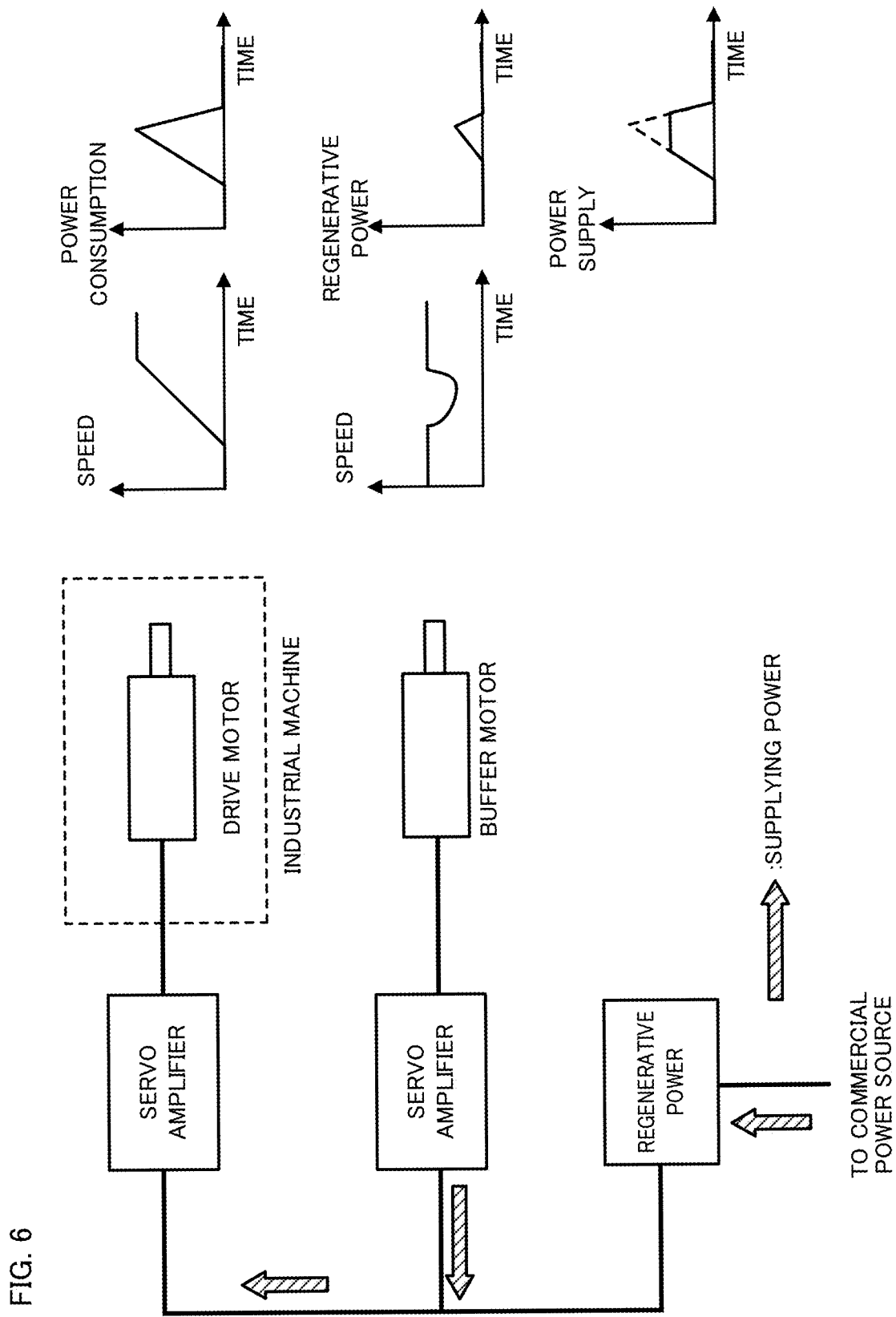
FIG. 6 illustrates how to lessen a peak of the power consumption by using regenerative power in the buffer motor.

As a variation of the controller 1 according to the illustrative embodiment, before the emergency stop detection unit 170 detects the removal of the emergency stop, the buffer motor command creation unit 140 may start issuing a command for adjusting the speed of the buffer motor 55 to the present speed. This variation takes account of a case where a delay may occur in detecting the removal of the emergency stop in the controller. For example, in a case of detecting the emergency stop and the removal of the emergency stop based on an energization state, some delay may occur from the actual removal of the emergency stop to the detection of the removal by the emergency stop detection unit 170. If the delay is large, it may affect the control on the buffer motor 55 when the emergency stop is removed. FIG. 5 is a graph illustrating changes in the speed of the buffer motor 55, the power consumption and the command speed when the emergency stop is removed while the buffer motor 55 is coasting in the above-described situation. As illustrated in FIG. 5, when the emergency stop is removed in this situation, the delay causes a delay in outputting the command from the buffer motor command creation unit 140, and thereby the speed control is conducted on the buffer motor 55 in a state where a speed command is lost temporarily (reference sign F). When there is no speed command, the speed control is carried out with a normal speed being determined to be zero (reference sign G). As a result, the buffer motor 55 decelerates rapidly and thus the regenerative power is generated (reference sign H), and then the speed of the buffer motor 55 is controlled to return to the base speed Vb using the present speed of the buffer motor 55 as an initial speed. At this time, the buffer motor 55 accelerates rapidly, causing the large power consumption (reference sign I). Thus, as described above, the buffer motor command creation unit 140 always outputs the command for conducting control at the present speed of the buffer motor 55 during the emergency stop so that the increase in the power consumption causing such a delay can be prevented.

The embodiment of the present invention has been described as above, but the present invention is not limited to this embodiment. The present invention can be implemented in various aspects by making a modification appropriately.

REFERENCE SIGNS LIST

1 Controller
2, 4 Industrial Machine
5 Network
6 Fog Computing System
7 Cloud Server
8 Power Supply Channel
9 Common Power Source
11 CPU
12 ROM
13 RAM
14 Non-Volatile Memory
15, 17, 18, 20, 21 Interface
22 Bus
30, 35 Axis Control Circuit
40, 45 Servo Amplifier
50 Servomotor
55 Buffer Motor
70 Display Device
71 Input Device
72 External Device
100 Command Creation Unit
110 Control Unit
120 Power Consumption Calculation Unit
130 Power Supply Calculation Unit
140 Buffer Motor Command Creation Unit
150 Buffer Motor Control Unit
160 Motor Speed Determination Unit
170 Emergency Stop Detection Unit
200 Control Program
210 Setting Storage Unit

The invention claimed is:

1. A controller for controlling a buffer motor that is supplied with power from a power source shared with a drive motor for driving an industrial machine, comprising:
   a motor speed determination unit that determines a present speed of the buffer motor;
   an emergency stop detection unit that detects a state of emergency stop;
   a buffer motor command creation unit that defines a speed of the buffer motor determined by the motor speed determination unit as an initial speed at a predetermined timing after removal of the emergency stop is detected by the emergency stop detection unit, and creates a command to return the speed of the buffer motor from the initial speed to a prescribed base speed defined beforehand at a prescribed acceleration defined beforehand; and
   a buffer motor control unit that controls the buffer motor based on the command created by the buffer motor command creation unit.

2. The controller according to claim 1, wherein the predetermined timing is a time at which the removal of the emergency stop is detected by the emergency stop detection unit.

3. The controller according to claim 1, wherein the predetermined timing is a time at which the speed of the buffer motor is equal to or lower than a prescribed threshold value, which is defined beforehand, after the removal of the emergency stop is detected by the emergency stop detection unit.

4. The controller according to claim 1, wherein the motor speed determination unit determines a speed of the buffer motor detected by a sensor as the present speed of the buffer motor.

5. The controller according to claim 1, wherein the motor speed determination unit determines a speed estimated based on a previous speed of the buffer motor as the present speed of the buffer motor.

6. The controller according to claim 1, wherein the motor speed determination unit determines a speed estimated from history of the speed of the buffer motor as the present speed of the buffer motor.

7. The controller according to claim 1, wherein the buffer motor command creation unit initiates a command to control the buffer motor to be the same speed as the present speed of the buffer motor determined by the motor speed determination unit before the removal of the emergency stop is detected by the emergency stop detection unit.

8. The controller according to claim 1, wherein the motor speed determination unit determines a speed estimated based on a speed of the buffer motor at a time at which the emergency stop is applied and a time taken from the emergency stop to present as the present speed of the buffer motor.

9. The controller according to claim 1, wherein after the removal of the emergency stop, a torque of the buffer motor is limited to be equal to or lower than a prescribed threshold value, which is defined beforehand, until the buffer motor reaches the base speed.

\* \* \* \* \*